April 5, 1960 A. H. MAGG 2,931,243
SHIFTING ROD AND LEVER SYSTEM FOR CHANGE SPEED GEARS
Filed June 26, 1956 4 Sheets-Sheet 1

Inventor:
ALFRED MAGG,
By Parry & Giere
ATTORNEY

April 5, 1960          A. H. MAGG          2,931,243

SHIFTING ROD AND LEVER SYSTEM FOR CHANGE SPEED GEARS

Filed June 26, 1956          4 Sheets-Sheet 3

Inventor:
ALFRED MAGG,
By Parry & Hiese
ATTORNEY

April 5, 1960 A. H. MAGG 2,931,243
SHIFTING ROD AND LEVER SYSTEM FOR CHANGE SPEED GEARS
Filed June 26, 1956 4 Sheets-Sheet 4

Inventor:
ALFRED MAGG,
By Parry & Giese
ATTORNEY

United States Patent Office 2,931,243
Patented Apr. 5, 1960

2,931,243

SHIFTING ROD AND LEVER SYSTEM FOR CHANGE SPEED GEARS

Alfred Helmut Magg, Friedrichshafen, Germany, assignor to Zahnradfabrik Friedrichshafen, Friedrichshafen am Bodensee, Germany Application June 26, 1956, Serial No. 594,041

Claims priority, application Germany July 2, 1955

10 Claims. (Cl. 74—473)

This invention relates to change speed gears and more particularly to a mechanism for shifting gears.

In conventional gear transmissions there is a main shaft and an auxiliary shaft or counter shaft including shifting rods and a gear shifting lever which meshes with the rods selectively for the purpose of shifting gears. In such systems the shifting rods or the grooves in these rods are located in a plane which is vertical with respect to the common plane of the main and auxiliary shafts in some instances, or else the rods are located in an arrangement whereby they can be engaged by means of a universally mounted shifting lever. In such prior constructions one or more sliding pinions or shiftable sleeves are at a considerable distance from the gear shift lever; accordingly gear selector forks of substantial length are required or an intermediate lever is required.

My present invention overcomes the disadvantages of prior constructions by an arrangement wherein lengthy gear selector forks or intermediate levers are unnecessary. Thus, it is an object of the invention to provide a simple, compact, and rugged mechanism for shifting the gears of a transmission using small mechanical components in such mechanism, which are cheap to manufacture and simple to assemble.

It is a further object to the invention to provide a gear shifting mechanism which is rugged and not subject to breakage.

Briefly, the invention comprises a construction wherein the shifting rods and an actuator lever are placed in proximity to the main and auxiliary shafts and transmission. Where a reverse gear is used in the transmission, the shifting rods and the actuator lever are placed adjacent thereto. In a preferred form of construction, at least one shifting rod, preferably the one which controls reverse gear or the reverse gear block, is arranged so as to be axially slidable and is provided with a notch directly engageable by the actuator lever. By such expedient, one selector fork and one shifting rod are eliminated. Further, the gear selector forks in my novel construction may be shorter than those used in conventional transmissions because the shifting rods are located closely adjacent the transmission shafts.

The particularly advantageous construction of my invention is effected by using a sleeve-like shifting member provided with a pair of shifting fingers of essentially integral construction and located at the ends of the sleeve-like member or collar.

Further characteristics of my invention will appear from the following description in conjunction with the appended drawing in which.

Figure 1:
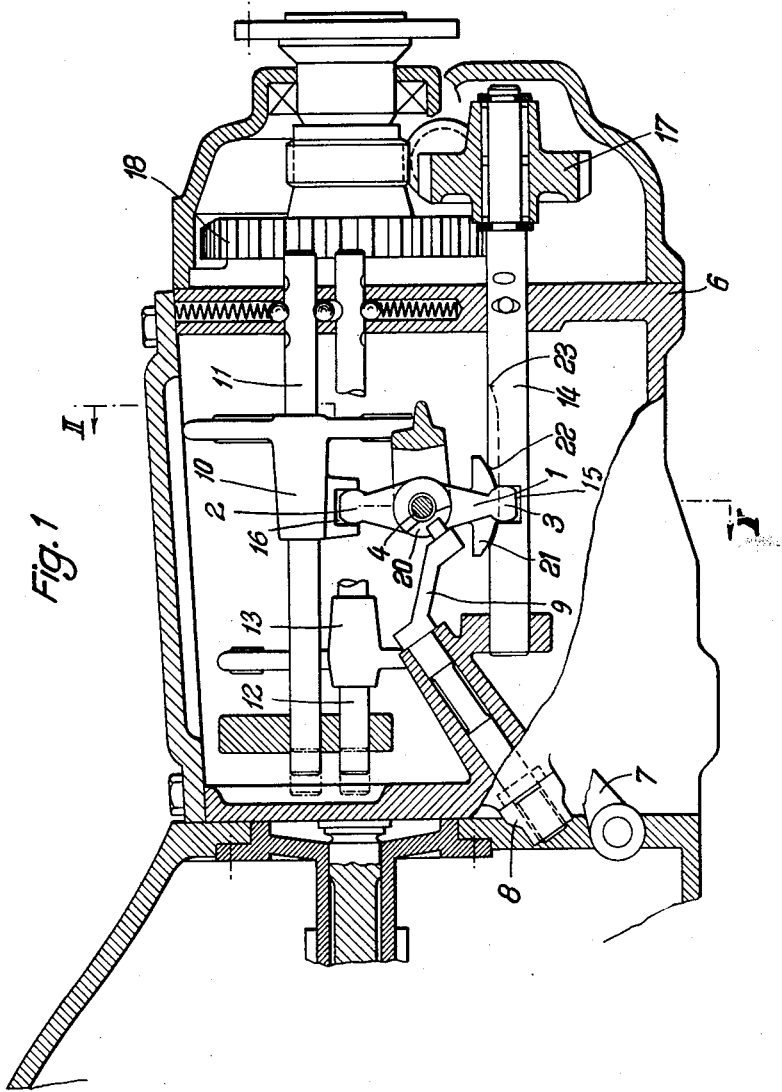
Fig. 1 shows a longitudinal section of a gear shift transmission through I—I of Fig. 2.
Figure 2:
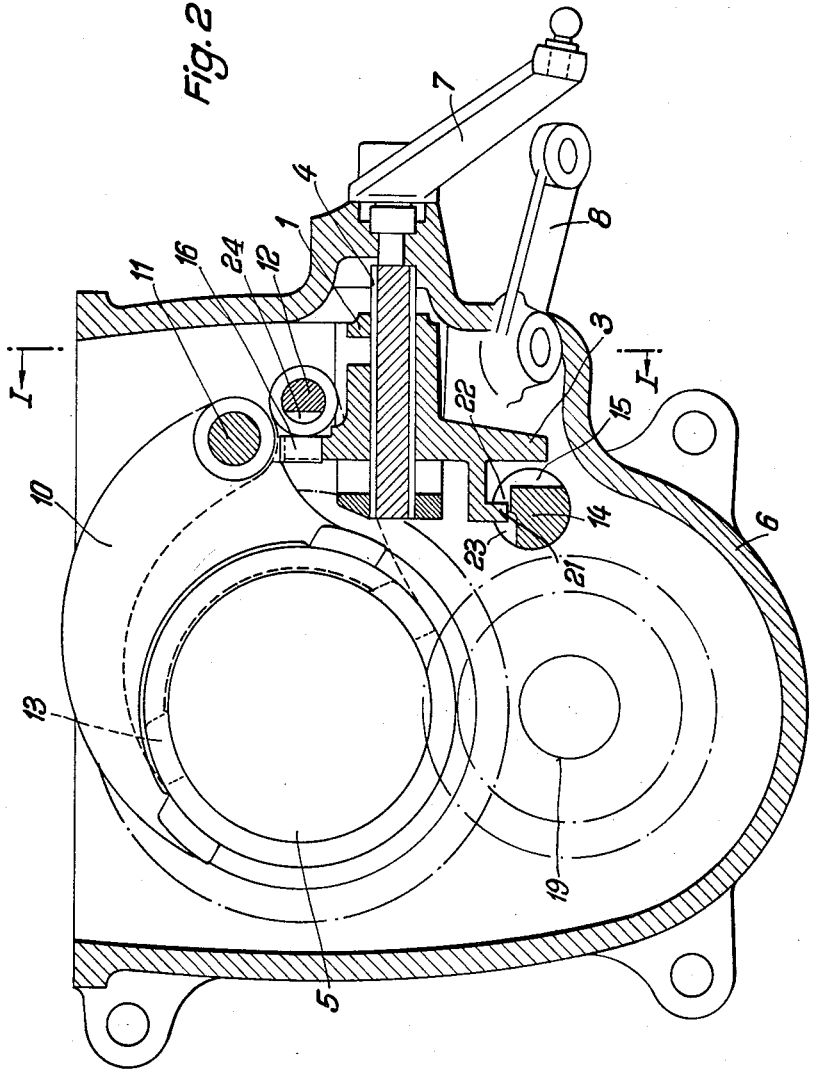
Fig. 2 shows a transverse section through II—II of Fig. 1.

Referring to Figs. 1 and 2, a shifting member or actuator lever 1 is disclosed provided with shift fingers 2 and 3. Actuator lever 1 is keyed to shaft 4 which is rotatably mounted. Lever 7, rotatably mounted in housing 6, is secured to shaft 4. Thus, rotation of lever 7 effects rotation of the actuator or shifting element 1. The shifting element 1 is also reciprocal with respect to the axis of shaft 4 by being slidably mounted on the shaft. Reciprocation of the lever 1 is effected by a lever 8 having an arm 9 engaged in a recess 20 of lever 1.

The finger 2 engages in a recess 16 of a gear selector fork 10 mounted on a shaft 11. Finger 2 likewise meshes with a recess 20 of a shifting rod 12. The shifting rod 12 carries a gear selector fork 13. The gear selector forks 10 and 13 operate shifting sleeves carried on the main shaft 5.

Finger 3 engages in a recess 15 of a shaft 14 which carries reverse gear 17. Gear 17 is engageable with a gear wheel 18 carried on the main shaft 5 and also with another gear (not shown) which will be understood to be carried on a countershaft 19.

Shaft 14 is provided with a circular recess 22 having its center of curvature on the axis of shaft 4.

Communicating with the recess 22 is a longitudinal groove 23 in the shaft 14. A locking element or protuberance 21, corresponding in arcuate shape to the recess 22, is carried by the shifting lever 1, which locking element is engaged in recess 22 to lock shaft 14 against axial motion, as well as lever 1 which is shown in position for shifting the rod 11. If actuator lever 1 is moved by reciprocation further to the right, finger 2 will engage recess 24 in rod 12. In either case, element 21 remains engaged in recess 22 while actuator 1 is rotated to shift rod 11 or 12, thus locking shaft 14 against longitudinal motion. When, however, lever 1 is moved to the left as viewed on Fig. 2, finger 3 engages in recess 15 and locking element 21 disengages from recess 22. Accordingly, shaft 14 is free and may now be reciprocated by means of lever 8, the locking element 21 being unrestrained in the groove 23. Thus rotation of finger 3 as effected by rotation of the lever 1 is operative to shift reverse gear 17, it being understood that gear 17 is axially locked on the shaft 14 and rotative thereon. It will further be understood that suitable detent elements such as springs and balls of conventional nature co-act with recesses in the several shifting rods, all as shown in Fig. 1, to hold the rods in selected reciprocated positions.

The control levers 7 and 8 may be operated by means of a shifting lever carried by an automobile steering wheel in a manner now well known.

Figure 3:
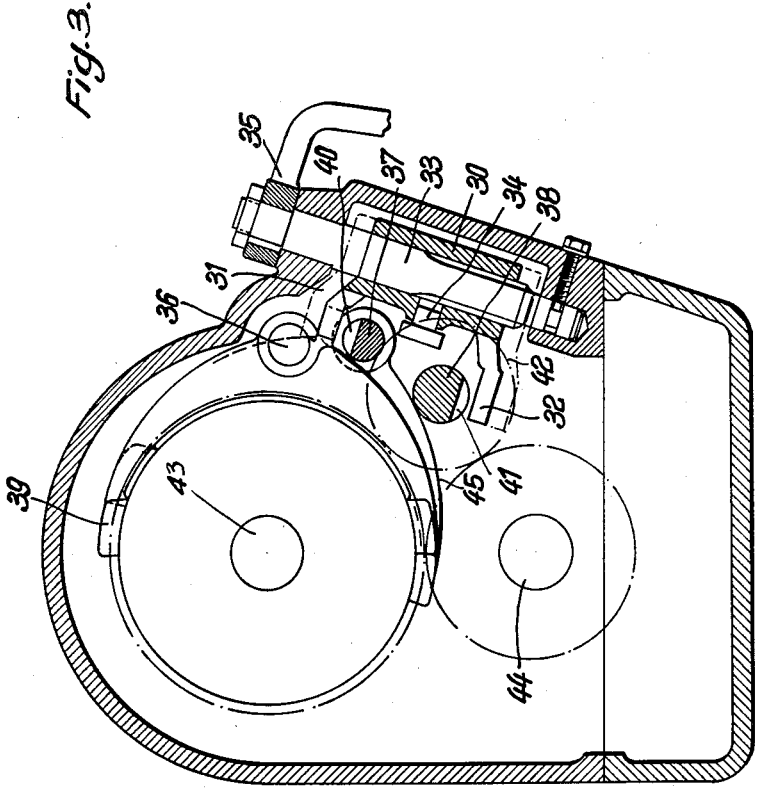
Fig. 3 shows a modification of the mechanism illustrated in Figs. 1 and 2.

An alternative construction is shown in Fig. 3 wherein the fingers which shift the rods may be arranged in parallel planes. Thus, a gear shifting collar 30 is provided which carries the fingers 31 and 32 at opposite ends thereof. The collar is keyed to a shaft 33 shown in high gear position and which collar is movable along the shaft by means of a lever 34 for the purpose of selecting gears. A lever 35 is provided which is keyed to the shaft 33 and which is rotative for the purpose of shifting gears. It will be understood that the fingers 31 and 32 reciprocate the rods 36, 37, and 38 by rotation of shaft 33.

In the position of the mechanism shown in Fig. 3, the finger 31 engages a gear selector fork 39 which, in this instance, may be considered as controlling the first and second gears; the fork 39 being secured to the shifting rod 36. By manipulation of the selector lever 34 the collar 30 may be pulled to downward position from the position shown in Fig. 3, in which case the finger 31 engages a recess 40 in the shifting rod 37. Fork 39 moves a fork 45 for shifting into third and fourth gear. By actuating the selector lever 34 so as to move the collar 30 upwardly, finger 32 engages in a recess 41 of the shifting rod 38. Thence, by actuation of the lever 35, a reverse gear 42 carried on the shifting rod 38 is brought into engagement.

By the arrangement wherein fingers 31 and 32 are at the ends of a shifting collar 30 and thus at a substantial distance from each other, it becomes possible to locate the reverse gear directly on or co-axial with a shifting rod. Accordingly, no special gear selector fork is needed for shifting the rod 38. At the same time, the shifting rods 36 and 37 are located immediately adjacent the main and counter shaft 43 and 44 so that the other selector forks such as 39 can be made short.

It will further be noted that the finger 32 is longer than the finger 31 and that finger 32 controls the reverse gear 42. Accordingly, the reverse gear can be arranged so that it must traverse a longer feed path than those members which are operated by the shorter finger.

Figure 4:
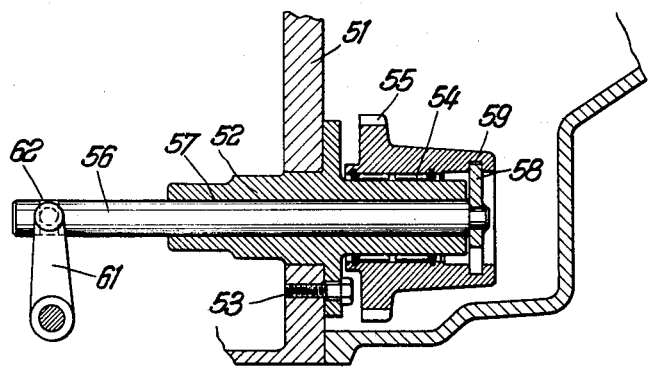
Fig. 4 shows a still further modification of the mechanisms illustrated in Figs. 1 to 3.

Fig. 4 shows a further modification of the gear transmission illustrated in Fig. 1 to 3, in which the reverse gear 55 is arranged to be rotatable and axially shiftable on a flanged hub 52 fixed to the housing 51 by screws 53. The gear 55 runs on a needle roller bearing 54 axially fixed to the gear 55 by split rings and as shown. Hub 52 has an interior bore 57 through which the shifting rod 56 passes. A finger 58 riveted to the end of rod 56 engages a groove 59 of the gear 55. A shifting lever 61 engages a groove 62 in the rod 56. By turning lever 61 and thereby shifting rod 56, also gear 55 is shifted axially to be thrown into or out of engagement with its meshing gear not shown in the drawing.

The design described herebefore is advantageous in that the flanged hub 52 offers an accurate and rugged bearing to the gear 55 and in the mean time, serves as a support to the shifting rod 56.

Instead of a single reverse gear a block of gears may be provided to serve several reverse speeds. Also, one single gear on either side of the housing 51 may be located on the flanged hub 52.

Having thus described my invention I am aware that various changes may be made without departing from the spirit thereof and therefore I do not seek to be limited to the precise illustration herein given except as set forth in the appended claims.

I claim:

1. In a gear shift transmission having a pair of transmission shafts and shiftable gears thereon, forks for shifting said gears, said forks having respective, reciprocal gear shifting rods having abutment means, including means for shifting said rods comprising a rotative lever having fingers selectively engageable with respective abutment means of said rods, said lever being disposed intermediate said rods, said one rod having an integral locking recess and said lever having a locking protuberance movable into said recess to prevent longitudinal motion of said rod, said recess and protuberance being shaped to permit rotation of said lever for operating at least one other rod, including an additional recess in said rod communicating with said locking recess, said lever being reciprocal on the axis of its rotation to effect selection of a gear shifting rod, said locking protuberance moving into said additional recess when moved out of said locking recess and being rotatable in said additional recess to permit shifting of said one rod carrying said reverse gear.

2. In a gear shift transmission, a plurality of at least three parallel gear shift rods, means for selectively shifting said rods comprising a rotative actuator having a pair of diametrically opposed fingers engageable selectively with said rods for shifting a selected rod, said actuator being reciprocal to effect selective engagement with a rod, selector means for reciprocating said actuator to effect said selective engagement, and means intermediate said actuator and one of said rods for locking said one rod when the actuator is reciprocally positioned to select another of said rods, and means for rotating said actuator to shift a selected rod.

3. In a gear shift transmission as set forth in claim 2, said actuator comprising a lever disposed intermediate two of said rods, one of said two rods being said one rod, said actuator being reciprocal to engage either rod.

4. In a gear shift transmission as set forth in claim 2, including a reverse gear carried on said one rod.

5. In a gear shift transmission as set forth in claim 2, said means for locking said one rod comprising an arcuate recess in said one rod, said actuator having a complementary shaped protuberance engageable in said recess upon reciprocation of said actuator, the center of arcuateness of said recess and protuberance being the center of rotation of said actuator, whereby said one rod is locked against longitudinal motion while permitting rotation of said actuator to effect shifting of another rod.

6. In a gear shift transmission having a pair of transmission shafts and shiftable gears thereon, forks for shifting said gears, said forks having respective reciprocal gear shifting rods comprising a rotative lever having fingers selectively engageable with respective abutment means of said rods, said lever being disposed intermediate said rods, including a fixed housing, a reverse gear, a shifting rod and a lever having a finger selectively engageable with said rod for shifting said reverse gear, said reverse gear being arranged to be rotatable and axially shiftable on said fixed housing.

7. A transmission as set forth in claim 6, said reverse gear being mounted on a flange fixed to said housing, said flange having an internal bore, said shifting rod passing through said bore and having a finger engageable with said gear.

8. In a gear shift transmission having a plurality of shifting rods, an actuator comprising a rotatable and reciprocative element, a pair of fingers carried by said element and extending therefrom substantially normal to the direction of reciprocation of said element and selectively engageable with said rods by reciprocation of said element and being effective to shift said rods upon rotation of said element, said element comprising a rotative sleeve carrying said fingers, said fingers being arranged at the same side of said sleeve with respect to the axis of rotation of said sleeve, one of said fingers being longer than the other, a shifting rod directly carrying a reverse gear, said longer finger being engageable with said latter shifting rod to effect shifting of said transmission into reverse.

9. In a gear shift transmission having a plurality of shifting rods, an actuator comprising a rotative and reciprocative element, a pair of fingers carried by said element and extending therefrom substantially normal to the direction of reciprocation of said element and selectively engageable with said rods by reciprocation of said element and being effective to shift said rods upon rotation of said element, one of said fingers being longer than the other, a shifting rod directly carrying a reverse gear, said longer finger being engageable with said latter shifting rod to effect shifting of said transmission into reverse.

10. In a gear shift transmission, a plurality of parallel gear shift rods, means for selectively shifting said rods comprising a rotative actuator 1 having a pair of diametrically opposed fingers engageable selectively with said rods for shifting a selected rod, said actuator being reciprocal to effect selective engagement with a rod, selector means for reciprocating said actuator to effect said selective engagement, and means intermediate said actuator and one of said rods for locking said one rod when the actuator is reciprocally positioned to select another of said rods, said means for rotating said actuator to shift a selected rod, said means for locking said one rod comprising an arcuate recess in said one rod, said actuator having a complementary shaped protuberance engageable in said recess upon reciprocation of said actuator, the center of arcuateness of said recess and protuberance being the center of rotation of said actuator, whereby said one rod is locked against longitudinal motion while permitting rotation of said actuator to effect shifting of another rod.

References Cited in the file of this patent

UNITED STATES PATENTS

| | | |
|---|---|---|
| 1,757,414 | Collins | May 6, 1930 |
| 1,970,098 | Manville | Aug. 14, 1934 |
| 2,029,178 | Manville | Jan. 28, 1936 |
| 2,800,033 | Zittrell | July 23, 1957 |

FOREIGN PATENTS

| | | |
|---|---|---|
| 849,477 | France | Aug. 21, 1939 |
| 531,413 | Great Britain | Jan. 3, 1941 |
| 982,559 | France | Jan. 31, 1951 |